United States Patent [19]

Bise et al.

[11] 3,778,563

[45] Dec. 11, 1973

[54] VOICE FREQUENCY REPEATER

[75] Inventors: Donald L. Bise, Tustin; Ronald J. Surprenant, Anaheim, both of Calif.

[73] Assignee: Lear Siegler, Inc., Santa Monica, Calif.

[22] Filed: Mar. 29, 1972

[21] Appl. No.: 239,026

[52] U.S. Cl. .......................... 179/170 R, 179/170 D

[51] Int. Cl. .............................................. H04b 3/36

[58] Field of Search .................... 179/170 D, 170 T, 179/170 R; 333/81 R

[56] References Cited

UNITED STATES PATENTS 2,812,388 11/1957 Thomas .......................... 179/170 D 1,973,504 9/1934 Pierrot ........................... 179/170 D

FOREIGN PATENTS OR APPLICATIONS 1,054,320 1/1967 Great Britain .................. 179/170 T

*Primary Examiner*—William C. Cooper

*Assistant Examiner*—Alan Faber

*Attorney*—Robert L. Parker et al.

[57] ABSTRACT

A repeater useful in 2-wire line telephone systems employs a pair of hybrid sets, each of which is rotated 90 degrees relative to the normal operation position. A relatively small hybrid set having a relatively low inductance has an inductor connected in the secondary, which has an inductance related to the inductance of the primary, to eliminate the need for the retard coils typically employed in the direct current line for repeaters, and also the need for isolation transformers. Consequently, the repeater is relatively economical and smaller in size. An attenuator employing L half-sections in the input of each amplifier provides direct reading gain and a bandpass amplifier in the input of each amplifier provides increased stability by eliminating the high and low frequencies outside the voice frequency band.

3 Claims, 5 Drawing Figures

VOICE FREQUENCY REPEATER

BACKGROUND OF THE INVENTION

1. Field of the Invention

This invention relates to a special transmission system of the type which includes a telephone repeater in the transmission line. Telephone repeaters are useful in 2-wire lines as well as 4-wire lines and other transmission systems. 2-wire lines are commonly used in the telephone art between a subscriber's set and the central office. 4-wire lines are generally employed as the trunk lines between telephone offices.

2. Prior Art

When the distance is great between the offices or between the central office and the subscriber's set, the inherent attenuation in the line may require the use of repeaters in the lines. It is essential that these repeaters be spaced closely enough along the line to prevent the signal from dropping into the noise level from which it cannot be recovered.

When two 1-way amplifiers are employed in these repeaters to provide amplification in both directions, a special arrangement must be used to prevent singing or cross-talk. Such a special arrangement in repeaters typically includes hybrid coils to provide balanced circuits and isolation between the two directions. In the subscriber's loop it is also necessary to provide a direct current path for signalling. Direct current may be transmitted for dialing purposes, for energization of supervisory signals at the central office, or for energization of the subscriber's telephone transmitter. Low frequency alternating current signals (up to 66 Hertz, for example) may also be transmitted for signalling purposes.

When employing hybrid coils, it is necessary to provide direct current paths either through the hybrid coils or around the hybrid coils for direct current continuity in the transmission lines. Typically, relatively large and expensive retard coils are required in this direct current path to isolate the voice frequency signals from the direct current and low frequency signals.

SUMMARY OF THE INVENTION

In accordance with this invention, direct current continuity between the transmission lines is maintained and the circuits are balanced by use of a relatively inexpensive and simple circuit arrangement. The repeater of this invention includes two hybrid sets with each set including hybrid coils that are essentially rotated 90° relative to the usual way of connecting hybrid coils in repeaters. Each hybrid set includes a pair of line windings and a center tapped amplifier winding. A line winding of one set is connected to another line winding in the other set to provide direct current continuity through the repeater. A decoupling circuit for voice frequency signals is connected between the first and second hybrid sets.

The amplifier for one direction of transmission is connected between one terminal of the amplifier winding of the first hybrid set and one terminal of the amplifier winding of the second hybrid set. The amplifier for the other direction of transmission is connected between the other terminal of the amplifier winding of the first hybrid set and the other terminal of the amplifier winding of the second hybrid set. The center taps of the amplifier windings are connected to ground reference through impedance matching networks. In addition to the impedance matching networks, inductors are connected between each center tap and ground reference for balancing out the inductance of the line windings of each hybrid set.

The repeater in accordance with this invention advantageously includes an attenuator in the input circuit of each amplifier, which attenuator is made up of L half-sections and has screw-type connectors in parallel with each resistor in the series path and a screw-type connector in series with each resistor in the parallel paths. The gain for each direction is directly read from the position of the screw-type connectors.

Advantageously, the repeater further includes a bandpass filter in the input of at least one amplifier to eliminate low frequency and high frequency singing paths. In accordance with this invention, it is possible to employ a single transistor power amplifier to provide the desired amplification.

BRIEF DESCRIPTION OF THE DRAWING

These and other features and advantages of the present invention may be understood more fully and clearly from a consideration of the following specification and drawing, in which.

DETAILED DESCRIPTION OF THE PREFERRED EMBODIMENT

Figure 1:
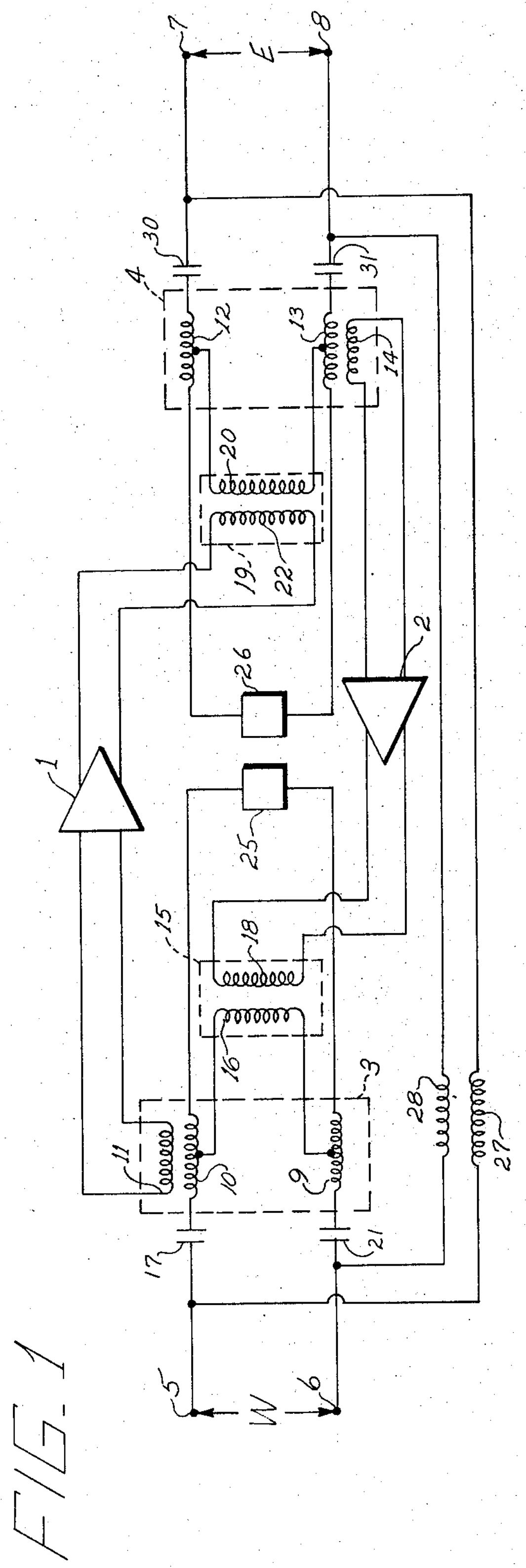
FIG. 1 is a schematic diagram of a prior art repeater.

A typical prior art repeater for 2-wire lines is shown schematically in FIG. 1. The repeater includes an amplifier 1 for amplifying the signals in one direction of transmission and an amplifier 2 for amplifying the signals in the opposite direction of transmission. To provide balance between the two directions of transmission, a hybrid coil set 3 is employed in one side of the repeater and another hybrid coil set 4 is employed in the other side of the repeater.

The repeater of FIG. 1 has two input terminals 5 and 6 which are associated with the direction of transmission generally represented by the letter "W" for West. The repeater also includes another pair of input terminals 7 and 8 associated with the direction of transmission generally represented by the letter "E" for East.

Hybrid coil set 3 includes a pair of line windings 9 and 10, that are center tapped, and an amplifier winding 11, the three windings being inductively coupled.

Hybrid coil set 4 is similarly constructed and has a pair of line windings 12 and 13 and an amplifier winding 14 which are inductively coupled.

A transformer 15 is coupled to the center taps of the line windings 9 and 10 through the primary 16 of the transformer. The transformer 15 also includes a secondary winding 18 connected to the output of amplifier 2. An isolation transformer 19 is similarly connected to the center taps of line windings 12 and 13 in hybrid set 4. Transformer 19 has a primary winding 20 connected to the center tap of the line windings 12 and 13. The transformer 19 further includes a secondary winding 22 connected to the output of amplifier 1.

The line windings 9 and 10 of hybrid set 3 each have one terminal connected to a balancing network 25. The line windings 12 and 13 of hybrid set 4 are similarly connected to a balancing network 26.

The direct current path between terminals 5 and 6 and terminals 7 and 8 are through a pair of retard coils 27 and 28. Retard coil 27 is connected between terminal 5 and terminal 7 and retard coil 28 is connected between terminal 6 and terminal 8. A capacitor 17 connected between terminal 5 and winding 10 and a capacitor 21 connected between terminal 6 and winding 9 provide isolation between the signalling signals and the voice frequency signals in the system. Similarly, a capacitor 30 connected between terminal 7 and winding 12 and a capacitor 31 connected between terminal 8 and winding 13 provide isolation at the other side of the repeater. Retard coils 27 and 28 cooperate with capacitors 17, 21, 30 and 31 to provide this isolation. These coils have a relatively high impedance to prevent a voice frequency feedback path around the repeater. The repeater of FIG. 1 is relatively bulky and expensive because of the isolation transformers 15 and 19 and retard coils 27 and 28.

Figure 2:
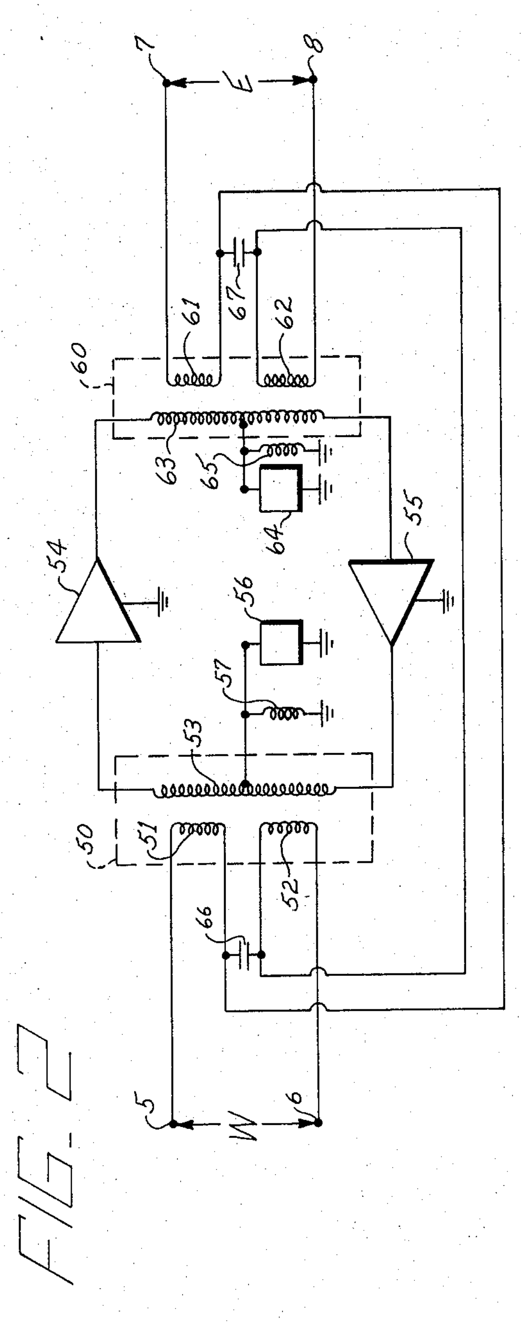
FIG. 2 is a schematic diagram of a repeater in accordance with the present invention.

In accordance with the present invention, these relatively expensive and bulky components are eliminated by the repeater shown schematically in FIG. 2. As an aid in understanding the operation of the circuit of FIG. 2, reference may be made to the schematic diagrams of FIGS. 3 and 4.

Figure 3:
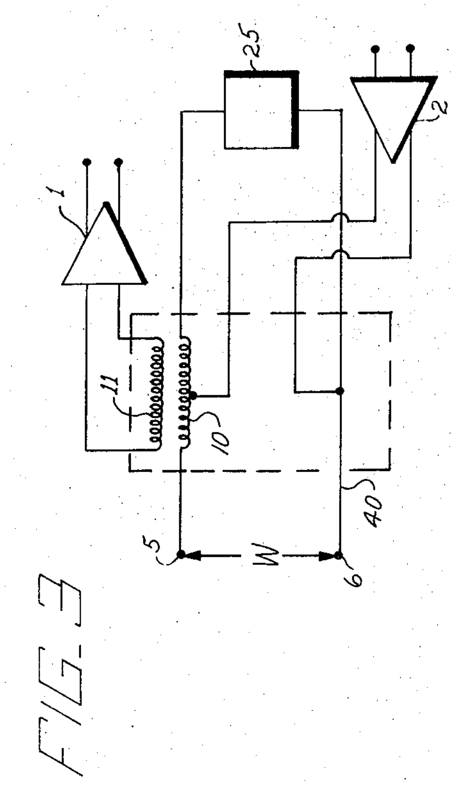

The hybrid set 3 of FIG. 1 is depicted in FIG. 3 as representative of a typical connection for hybrid coils. In the schematic diagram of FIG. 3, the lower line winding 9 is omitted for purposes of simplicity. Similarly, the isolation transformer 15 is omitted and the amplifier 2 is connected directly to the center tap of line winding 10 and the lower line 40.

The balancing network 25 is connected between line winding 10 and lower line 40, similar to the connection in FIG. 1. Additionally, the output of amplifier 1 is connected to amplifier winding 11 of hybrid set 3. The circuit of FIG. 3 thus schematically illustrates the typical connection for a hybrid set in a repeater.

It should be noted that in most hybrid sets for repeaters the line windings are split and a lower line winding 9, as shown in FIG. 1, is employed in the lower line to provide balance with respect to ground for the repeater lines. Thus, in the circuit of FIG. 3, there is no balance with respect to ground. However, for purposes of illustration, this balance to ground is not necessary.

Figure 4:
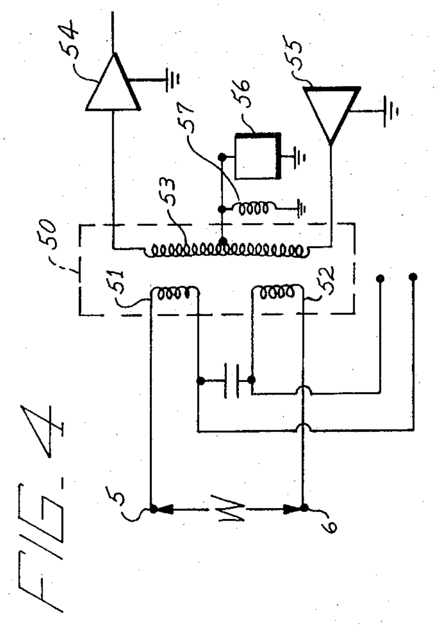
FIGS. 3 and 4 are schematic diagrams of hybrid coils useful in understanding the present invention.

It has been found that the retard coils may be eliminated, the isolation transformer may be eliminated, and balance to ground for the amplifying circuits provided by essentially rotating the hybrid set depicted in FIG. 3 by 90° and connecting the input terminals, balancing networks, and amplifiers, as shown in FIG. 4.

In the circuit of FIG. 4, a hybrid set 50 includes a pair of line windings 51 and 52 and a center tapped amplifier winding 53. One terminal of the amplifier winding 53 is connected to the input of an amplifier 54 while the other terminal of amplifier winding 53 is connected to the output of an amplifier 55. The center tap of amplifier winding 53 is connected through a balancing network 56 to ground reference. The balancing network is shunted by an inductor 57 connected between the center tap of amplifier winding 53 and ground reference.

Hybrid set 50 provides the desired isolation between the input and output amplifier lines, and also the desired direct current continuity between the 2-wire lines connected through the repeater. This is shown in the complete repeater circuit of FIG. 2.

In the circuit of FIG. 2, hybrid set 50 is connected to input terminals 5 and 6 while an identical hybrid set 60 is connected to input terminals 7 and 8. Hybrid set 60 includes a pair of line windings 61 and 62, each having one terminal connected to one of the terminals 7 and 8.

The hybrid set 60 further includes an amplifier winding 63 inductively coupled to the line windings 61 and 62. Amplifier winding 63 is center tapped and the center tap is connected to ground reference through a balancing network 64.

An inductor 65 is connected across the balancing network 64. An amplifier 54 for amplifying voice signals in one direction of transmission is connected between one terminal of amplifier winding 53 of hybrid set 50 and one terminal of amplifier winding 63 in hybrid set 60.

A second amplifier 55 for amplifying voice frequency signals for the opposite direction of transmission is connected between the other terminal of amplifier winding 63 of hybrid set 60 and the other terminal of amplifier winding 53 of hybrid set 50. An alternating-current decoupling capacitor 66 is connected between line windings 51 and 52 and an alternating current decoupling capacitor 67 is connected between line windings 61 and 62.

One terminal of line winding 51 is connected directly to one terminal of line winding 61 and one terminal of line winding 52 is connected directly to one terminal of line winding 62 to provide a direct current path between input terminals 5 and 7 and a direct current path between input terminals 6 and 8.

Inductor 57 has an inductance related to the inductance of the line windings 51 and 52. Preferably, this relationship is where the inductance of inductor 57 is equal to the inductance of the line windings 51 and 52 in series to provide balance in the network. Under these conditions the turns ratio of winding 53 to windings 51 and 52 in series would be 1 to 1. Similarly, the inductance of inductor 65 has an inductance related to and preferably equal to the inductance of line windings 61 and 62 of hybrid set 60. The use of inductors 57 and 65 allows hybrid sets 50 and 60 to be of small size and inductance and still prevent low frequency signals out of amplifier 55 from entering amplifier 54, and vice versa.

Additionally, the rotation of the typical hybrid set by 90 degrees and the connection of the amplifiers and balancing networks, as shown in FIG. 2, results in a common ground throughout the amplifying portion of the repeater, which is very desirable in telephone systems.

As a further feature of the repeater of FIG. 2, isolation transformers are not required because of the isolation provided by the windings of the two hybrid sets 50 and 60.

Figure 5:
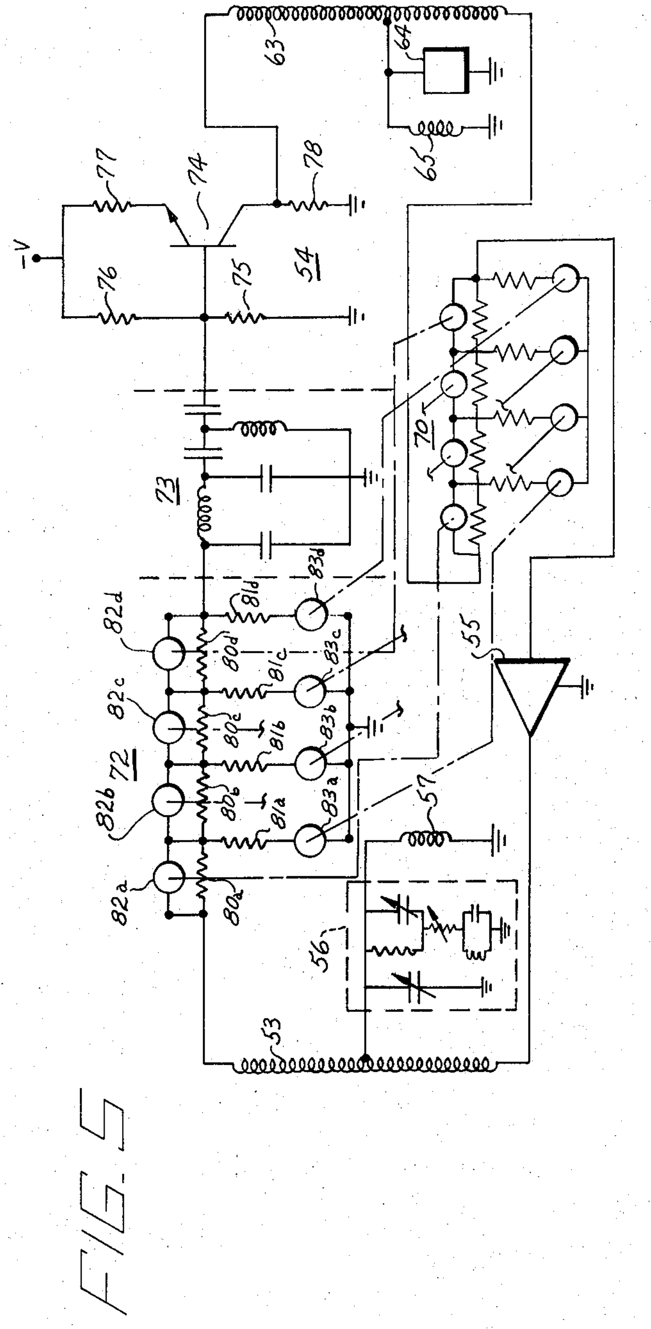
FIG. 5 is a schematic diagram of a portion of the repeater of FIG. 2 in accordance with the present invention depicting the balancing network, attenuator, and amplifier for one direction of transmission in greater detail.

The components for one direction of transmission in the amplifying section of the repeater are shown in greater detail in FIG. 5.

Advantageously, the amplifying paths, as shown in block form and schematic form for one direction of transmission and in schematic form for the other direction of transmission, includes an attenuator and a filter in the input of one amplifier and an attenuator only in the input of the other amplifier. For the east-west direction of transmission, an attenuator 70 is connected in the input circuit of amplifier 55, as shown in FIG. 5.

In the opposite direction of transmission, an attenuator 72 and a filter 73 are connected in the input circuit of amplifier 54.

The amplifier 54 comprises an active element such as a transistor 74. The amplifier 54 further comprises a resistor 75 connected between the base of transistor 74 and ground reference. A resistor 76 is connected between the base of transistor 74 and a negative voltage source. A resistor 77 is connected between the emitter of the transistor 74 and the negative voltage source and a resistor 78 is connected between the collector of transistor 74 and ground reference. The output from the amplifier 54 is taken from the collector of the transistor 74.

Another feature of this invention is the fact that a single transistor, such as a transistor 74, may be employed as the active element of the power amplifier which must provide sufficient gain and output power for amplification of the voice frequency signals in one direction of transmission. A single transistor in the common collector configuration may be employed because of the direct current bypass of the collector load resistor provided by the inductor 65.

The attenuator 72 comprises cascaded L half-sections. Each L half-section has a series resistor 80 and a shunt resistor 81. Advantageously, switch means, such as screw type connectors 82 are connected across each series resistor 80 and a switch means, such as screw type connector 83 are connected in series with the shunt resistor 81. By starting with all of the series resistors 80 in the circuit and the parallel resistors 81 in the circuit, the gain of the amplifier section may be directly read by noting the position of the screw type switches. For example, with all L half-sections connected, the attenuator presents the greatest attenuation and the least gain. This condition is designated 0dB gain. Then the removal of successive L half-sections will represent an increase in gain which can be calibrated so that the gain can be directly read from the condition of the L half-sections.

For example, the series resistors 80 and shunt resistors 81 may be related in value such that the first L half-section, represented by resistor **80*a* and resistor 81*a*** may add one-half dB gain when removed from the circuit, the second L half-section provides 1 dB of gain when removed, the third provides 2dB gain when removed and the fourth provides 4dB of gain when removed. By removing a selected section or combination of sections the gain may be increased in one-half dB steps up to 7½ dBs.

Advantageously the half-sections for each direction may be slaved as illustratively shown in FIG. 5 so that the same gain is provided for each direction.

In addition to the attenuator 72 in the input circuit of amplifier 54, filter 73 is connected in the input. Filter 73 is a bandpass filter designed to pass the voice frequency signals and to reject signals below and above this frequency. Advantageously, the bandpass filter 73 limits the total frequency range of the repeater, thereby providing additional stability at both the high and low freqencies of the band to prevent oscillation in the amplifying circuit or loop which includes amplifiers 54 and 55.

In a typical connection input terminals 7 and 8 are connected to a two-wire line in a central office which has a 900 ohm, 2, microfarad characteristic and terminals 5 and 6 are connected to a subscriber's set. Thus, the balancing network 64 may be designed to balance the characteristic impedance of the central office two-wire line while balancing network 56 has variable components for balancing against the two-wire line from the subscriber's set, which sets may be at various distances from the central office.

In operation, the repeater, as shown in FIGS. 2 and 5, amplifies voice frequency signals for both directions of transmission in an economical and efficient manner while providing direct current paths for signalling without the need for retard coils in the DC path. Incoming signals from the west are applied to input terminals 5 and 6 and are coupled through line windings 51 and 52 to amplifier winding 53. One-half of the signal appearing acorss amplifier winding 53 is applied to the input of amplifier 54 while the other half is applied to the output of amplifier 55. Amplifier 54 amplifies the voice frequency signal, which amplified signal thereafter appears across the upper half of amplifier winding 63. This amplified signal is then coupled through the hybrid set 60 and appears across line windings 61 and 62 to be transmitted through the input terminals 7 and 8 to the adjacent two-wire line.

Similarly, signals from the east are amplified by amplifier 55 and transferred to the terminals 5 and 6 to be coupled to the adjacent two-wire line.

Various modifications may be made in the details of construction without departing from the sprirt and scope of this invention which is defined by the appended claims.

What is claimed is:

1. A four-terminal voice frequency repeater for use in a two-wire line comprising:

- a first transformer having a center-tapped amplifier winding and a pair of line windings;
- a second transformer having a center-tapped amplifier winding and a pair of line windings;
- one terminal of each line winding being connected to a separate terminal of the repeater,
- the second terminal of each line winding of the first transformer being connected together through a capacitor,
- the second terminal of each line winding of the second transformer being connected together through a capacitor;
- circuit means connecting the second terminal of one line winding of the first transformer to the second terminal of one line winding of the second transformer;
- circuit means connecting the second terminal of the other line winding of the first transformer to the second terminal of the other line winding of the second transformer;
- a first amplifier circuit being connected between one terminal of the amplifier winding of the first transformer and one terminal of the amplifier winding of the second transformer;
- a second amplifier circuit being connected between the other terminal of the amplifier winding of the first transformer and the other terminal of the amplifier winding of the second transformer;

a first balancing network connected between the center tap of the amplifier winding of the first transformer and ground reference; and a second balancing network connected between the center tap of the amplifier winding of the second transformer and ground reference, each amplifier circuit including an attenuator network connected between the terminal of the amplifier winding and the input of the active element of the amplifier circuit, with the attenuator network comprising:

a plurality of resistors connected in series between the terminal of the line winding and the input to the active element of the amplifier circuit, a plurality of shunt resistors with a shunt resistor connected between each junction between two series resistors and ground reference and a shunt resistor connected between the input to the active element and ground reference, individual switch means connected across each series resistor, and individual switch means connected between each shunt resistor and ground reference.

2. A voice frequency repeater in accordance with claim 1 wherein the removal of each L half-section causes a preselected increase in the gain of the amplifier circuit.

3. A voice frequency repeater in accordance with claim 1 wherein the switch means for each L half-section in the first amplifier circuit is mechanically coupled to the switch means in the corresponding L half-sections of the second amplifier circuit.

* * * * *